(12) United States Patent
Kosaka et al.

(10) Patent No.: US 12,355,927 B2
(45) Date of Patent: Jul. 8, 2025

(54) INFORMATION PROCESSING APPARATUS AND INFORMATION PROCESSING METHOD

(71) Applicant: FUJIFILM Business Innovation Corp., Tokyo (JP)

(72) Inventors: Fumi Kosaka, Kanagawa (JP); Shigeru Okada, Kanagawa (JP); Shusaku Kubo, Kanagawa (JP); Yusuke Suzuki, Kanagawa (JP); Masayuki Yamaguchi, Kanagawa (JP); Jun Ando, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 767 days.

(21) Appl. No.: 17/373,740

(22) Filed: Jul. 12, 2021

(65) Prior Publication Data
US 2022/0311889 A1 Sep. 29, 2022

(30) Foreign Application Priority Data
Mar. 24, 2021 (JP) .................. 2021-050773

(51) Int. Cl.
H04N 1/04 (2006.01)
G06V 30/416 (2022.01)
H04N 1/00 (2006.01)
G06V 30/10 (2022.01)

(52) U.S. Cl.
CPC ....... *H04N 1/00641* (2013.01); *G06V 30/416* (2022.01); *H04N 1/04* (2013.01); *G06V 30/10* (2022.01)

(58) Field of Classification Search
USPC ......................................................... 358/453
See application file for complete search history.

(56) References Cited

U.S. PATENT DOCUMENTS 11,657,367 B2  5/2023  Iwase

FOREIGN PATENT DOCUMENTS

| CN | 107908745 | 4/2018 |
|----|-----------|--------|
| JP | 2015102934 | 6/2015 |
| JP | 2021033831 | 3/2021 |

OTHER PUBLICATIONS

"Office Action of Europe Counterpart Application", issued on Mar. 4, 2024, p. 1-p. 5.

(Continued)

*Primary Examiner* — Cheukfan Lee
(74) *Attorney, Agent, or Firm* — JCIPRNET

(57) ABSTRACT

An information processing apparatus includes a processor configured to acquire plural scanned images obtained by scanning a bundle of paper media including a plural standard document bundles each of which is a set of a standard document and a related document related to the standard document, extract a title from the plural scanned images, extract, from the plural scanned images, an identifier that is assigned to be common within one standard document bundle and to be different between different standard document bundles, and divide the plural scanned images into bundles such that a scanned image from which the title is extracted is set as a bundle head, scanned images having the same identifier are included in the same bundle, and scanned images having different identifiers are included in different bundles.

8 Claims, 9 Drawing Sheets

(56) References Cited

OTHER PUBLICATIONS

"Office Action of Japan Counterpart Application", issued on Nov. 19, 2024, with English translation thereof, pp. 1-5.
Heath Goodrum et al., "Automatic classification of scanned electronic health record documents," International Journal of Medical Informatics, vol. 144, Dec. 2020, pp. 1-10.
"Search Report of Europe Counterpart Application", issued on Mar. 3, 2022, p. 1-p. 9.
"Office Action of Japan Counterpart Application", issued on Apr. 15, 2025, with English translation thereof, p. 1-p. 2.

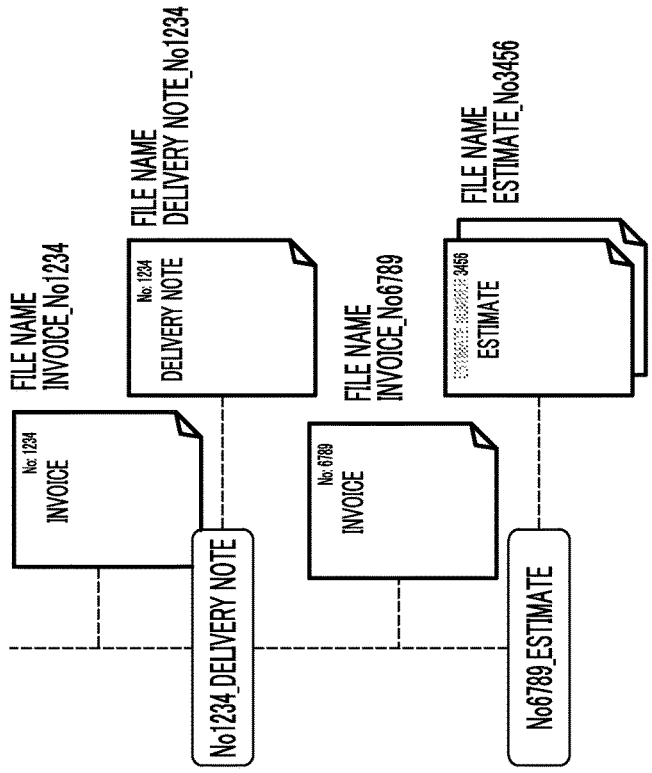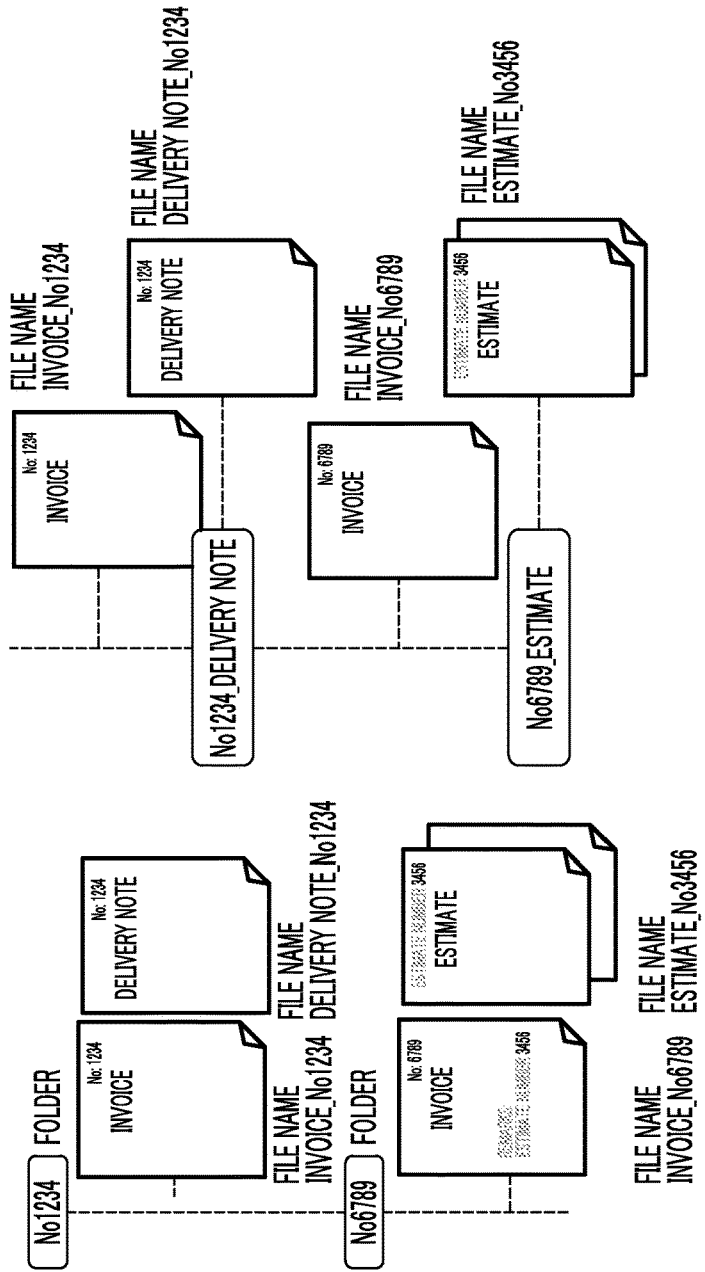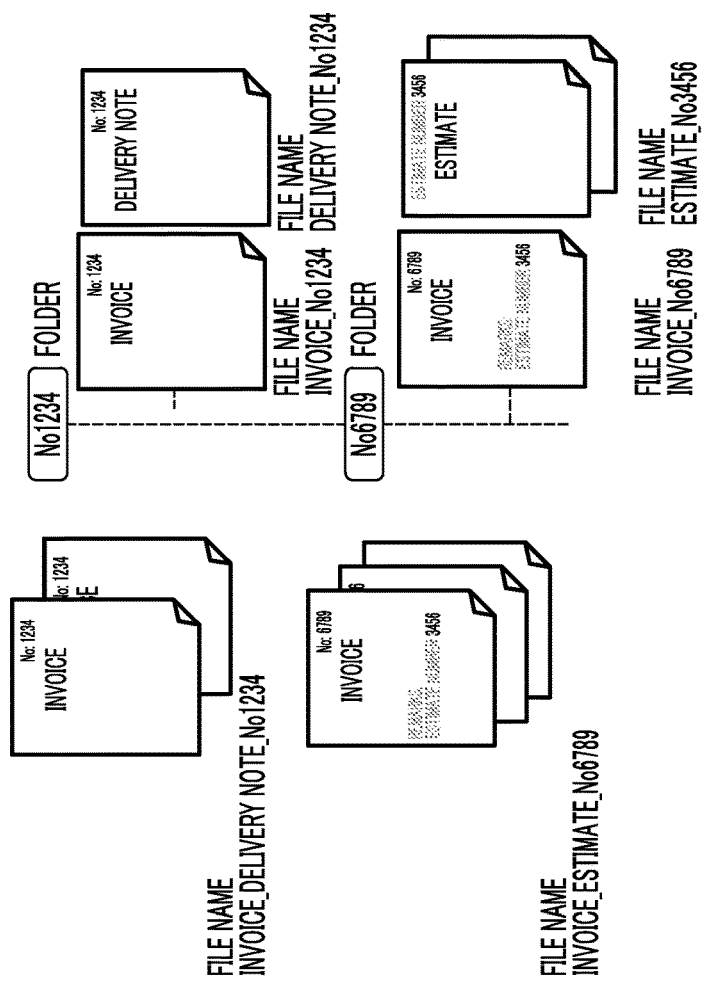

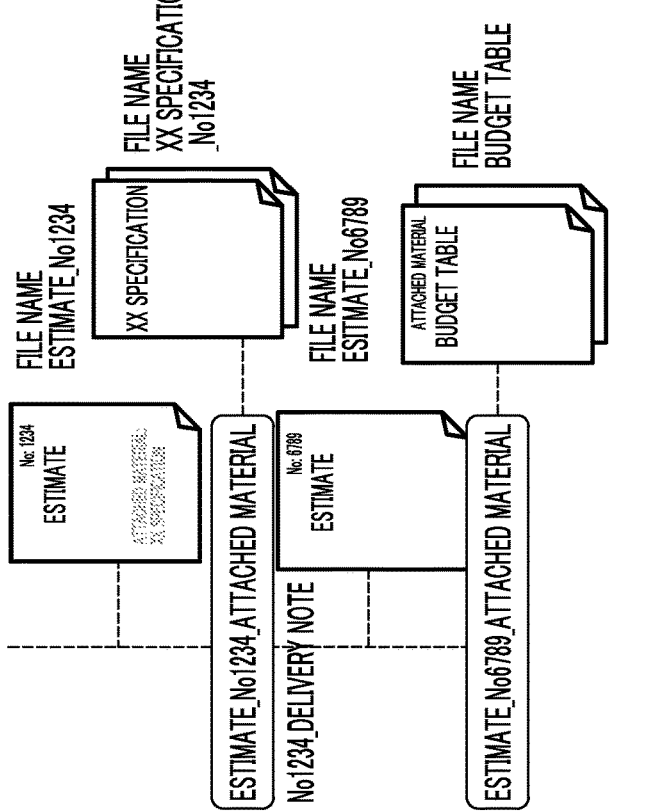
FIG. 7C
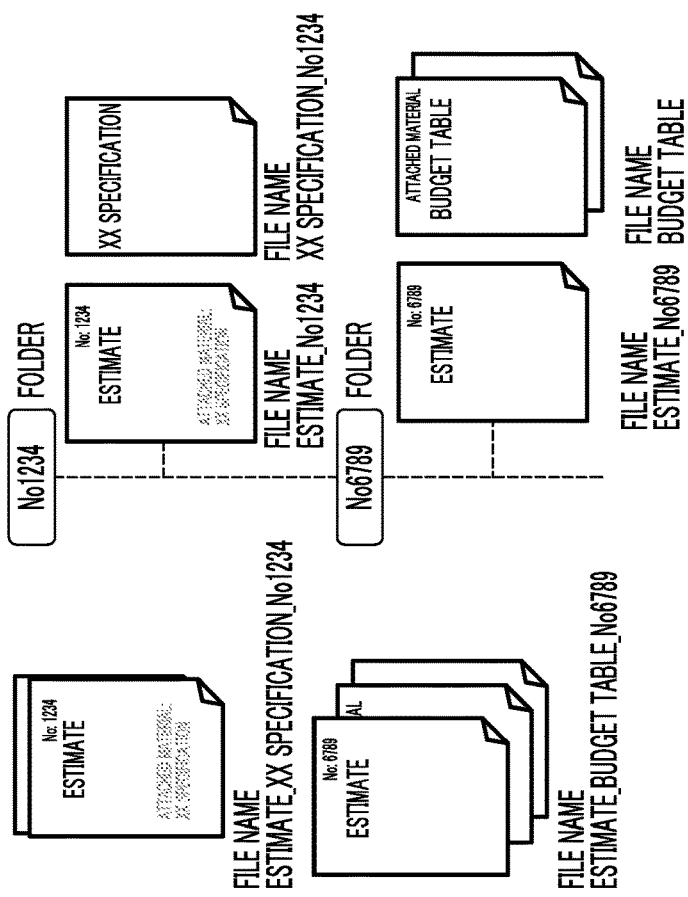
FIG. 7B
FIG. 7A

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2021-050773 filed Mar. 24, 2021.

BACKGROUND

(i) Technical Field

The present invention relates to an information processing apparatus and an information processing method.

(ii) Related Art

JP2015-102934A discloses an image forming apparatus having a scanner function and including a title detection unit that detects a title of a document read by the scanner function, a title file creation unit that creates a file having a title which is text of the title as a file name, and a title image data storage unit that stores image data of the document corresponding to a range of the title in the title file.

SUMMARY

Paper media documents written by a user are often scanned by an image scanning apparatus or the like to be converted into electronic data and are stored in a storage section such as a storage to be managed. In this case, documents having a predetermined commonality may be collectively managed as a group of documents. In a case where processes are performed on electronic data for various purposes, an optical character recognition (OCR) process of recognizing written text from a document image may be performed.

On the other hand, a group of documents collectively managed may be required to be classified (hereinafter, also referred to as "divided") into different bundles for a certain purpose. For example, a bundle of a combination of a slip (hereinafter referred to as a "standard document") such as an invoice and a document (hereinafter referred to as a "related document") related to a standard document, such as a delivery note, is one bundle (hereinafter referred to as "standard document bundle"), and a group of documents is divided into a plurality of standard document bundles. In the related art, there is a technique in which a title of a document is extracted and documents within a range associated with the title are divided as one bundle. However, in title extraction, division into standard document bundles appropriate for a purpose cannot be realized at all times.

Aspects of non-limiting embodiments of the present disclosure relate to an information processing apparatus and an information processing method capable of reducing a document wanted to be included in a certain set from being included in another set in a case where a plurality of scanned images obtained by scanning a bundle of paper media including a plurality of sets of standard documents and related documents related to the standard documents are divided for each set.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a plurality of scanned images obtained by scanning a bundle of paper media including a plurality of standard document bundles each of which is a set of a standard document and a related document related to the standard document; extract a title from the plurality of scanned images; extract, from the plurality of scanned images, an identifier that is assigned to be common within one standard document bundle and to be different between different standard document bundles; and divide the plurality of scanned images into bundles such that a scanned image from which the title has been extracted is set as a bundle head, scanned images having the same identifier are included in the same bundle, and scanned images having different identifiers are included in different bundles.

BRIEF DESCRIPTION OF THE DRAWINGS

Exemplary embodiment (s) of the present invention will be described in detail based on the following figures, wherein:

FIGS. 4A to 4C are schematic diagrams showing examples of post-processes of the division process according to the first exemplary embodiment;

FIGS. 7A to 7C are schematic diagrams showing examples of post-processes of the division process according to the second exemplary embodiment;

DETAILED DESCRIPTION

Hereinafter, exemplary embodiments for embodying the technique of the present disclosure will be described in detail with reference to the drawings. As an example, an information processing apparatus 10 according to the present exemplary embodiment will be described as a server that manages data obtained by scanning documents, slips, and the like. However, the present disclosure is not limited to this. The information processing apparatus 10 may be mounted in a multifunction peripheral having functions such as a print function, a copy function, a scan function, and a facsimile function, or may be a terminal such as a personal computer.

First Exemplary Embodiment

Figure 1A:
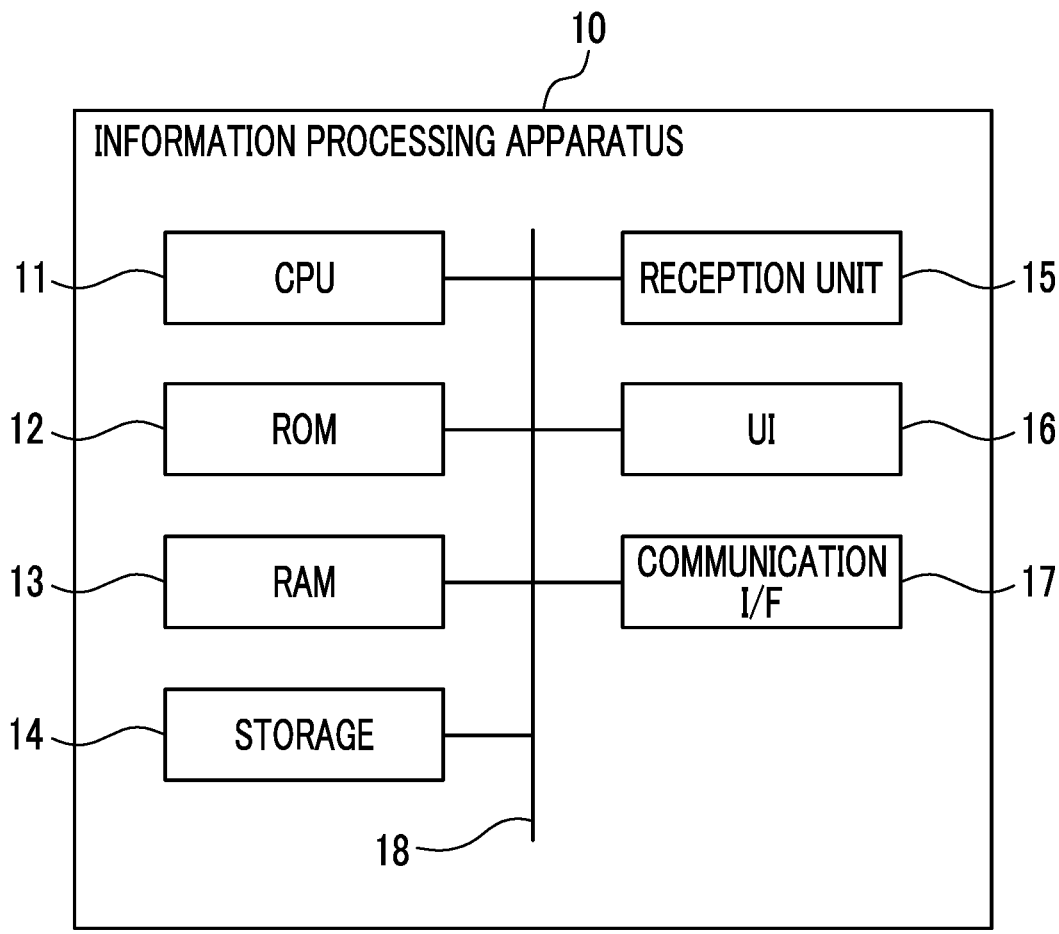
FIG. 1A is a block diagram showing an example of a hardware configuration of an information processing apparatus according to each exemplary embodiment.

An information processing apparatus, an information processing system, and an information processing program according to the present exemplary embodiment will be described with reference to FIGS. 1A to 5. As shown in FIG. 1A, an information processing apparatus 10 includes a central processing unit (CPU) 11, a read only memory (ROM) 12, a random access memory (RAM) 13, a storage 14, a reception unit 15, a user interface (UI) 16, and a communication interface (I/F) 17. The CPU 11, the ROM 12, the RAM 13, the storage 14, the reception unit 15, the UI 16, and communication I/F 17 are connected to each other via a bus 18. Here, the CPU 11 is an example of a processor according to an exemplary embodiment of the present invention.

The CPU 11 collectively controls the entire information processing apparatus 10. The ROM 12 stores various programs, data, and the like including a division process program used in the present exemplary embodiment. The RAM 13 is a memory used as a work area when various programs are executed. The CPU 11 performs various information processing by loading a program stored in the ROM 12 to the RAM 13 and executing the program. The storage 14 is, for example, a hard disk drive (HDD), a solid state drive (SSD), a flash memory, or the like. An information processing program or the like may be stored in the storage 14. The reception unit 15 receives, for example, a plurality of scanned images in units of pages in which a group of documents is scanned. The reception unit 15 is, for example, a Universal Serial Bus (USB). The UI 16 is, for example, a touch panel type liquid crystal screen, and receives instructions from a user, for example. The UI 16 may display image data or the like associated with the division process that will be described later and is executed by the information processing apparatus 10. The communication I/F 17 is an interface for connection to a network that will be described later, and performs transmission and reception of data with, for example, an image processing apparatus. Each of the storage 14, the reception unit 15, the UI 16, and the communication I/F 17 is not necessarily provided in the information processing apparatus 10, but may be selected and provided according to a form of the information processing apparatus 10.

Figure 1B:
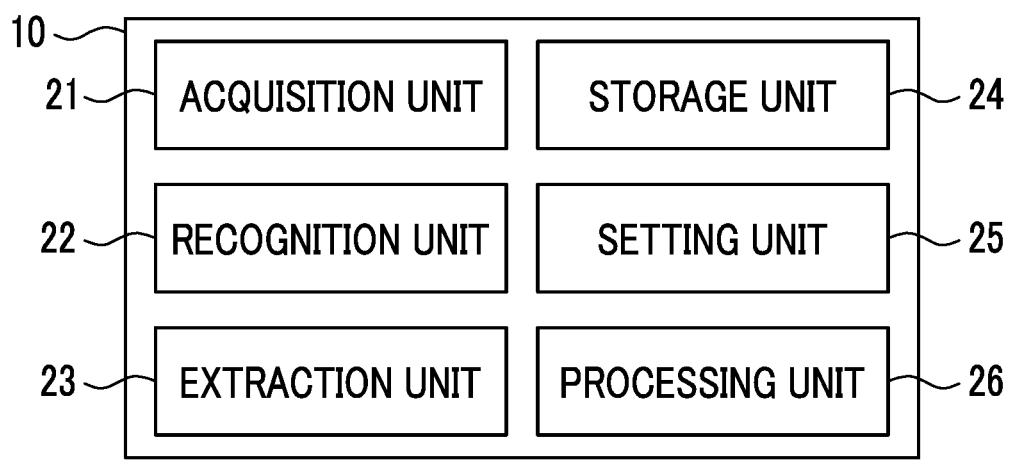
FIG. 1B is a block diagram showing an example of a functional configuration of the information processing apparatus.

Next, a functional configuration of the information processing apparatus 10 will be described with reference to FIG. 1B. FIG. 1B is a block diagram showing an example of a functional configuration of the information processing apparatus 10 according to the present exemplary embodiment.

As shown in FIG. 1B, the information processing apparatus 10 includes an acquisition unit 21, a recognition unit 22, an extraction unit 23, a storage unit 24, a setting unit 25, and a processing unit 26. The CPU 11 executes the information processing program to function as the acquisition unit 21, the recognition unit 22, the extraction unit 23, the storage unit 24, the setting unit 25, and the processing unit 26.

The acquisition unit 21 acquires images (scanned images) in units of pages in which paper media including a plurality of documents are scanned. For example, the acquisition corresponds to acquiring a scanned image via the reception unit 15 or the communication I/F 17.

The recognition unit 22 executes an OCR process on the scanned image and recognizes text included in the scanned image. The extraction unit 23 performs a title extraction process on the scanned image that has undergone the OCR process, and extracts a title from the scanned image. Key-value extraction is performed, and thus an identifier for determining a relevance between documents is extracted. The recognition unit 22 does not necessarily have to be provided in the information processing apparatus 10, and may be supplied with a scanned image having undergone an OCR process from the outside. The processing unit 26 reintegrates a standard document bundle that is a combination of the standard document and the related document into the bundle of documents (hereinafter referred to as a "division candidate bundle") divided by the title by using the identifier extracted by the extraction unit 23. In the present exemplary embodiment, as described above, the functions of the recognition unit 22, the extraction unit 23, and the processing unit 26 are realized by software based on an information processing program. However, the present exemplary embodiment is not limited to this, and the functions may be realized by hardware using a dedicated LSI such as an application specific integrated circuit (ASIC).

The storage unit 24 is realized by, for example, the storage 14, and stores results processed by the recognition unit 22, the extraction unit 23, the processing unit 26, or the like. The setting unit 25 is realized by, for example, the UI 16, and a user sets conditions or the like for information processing executed in the information processing apparatus 10.

Figure 2:
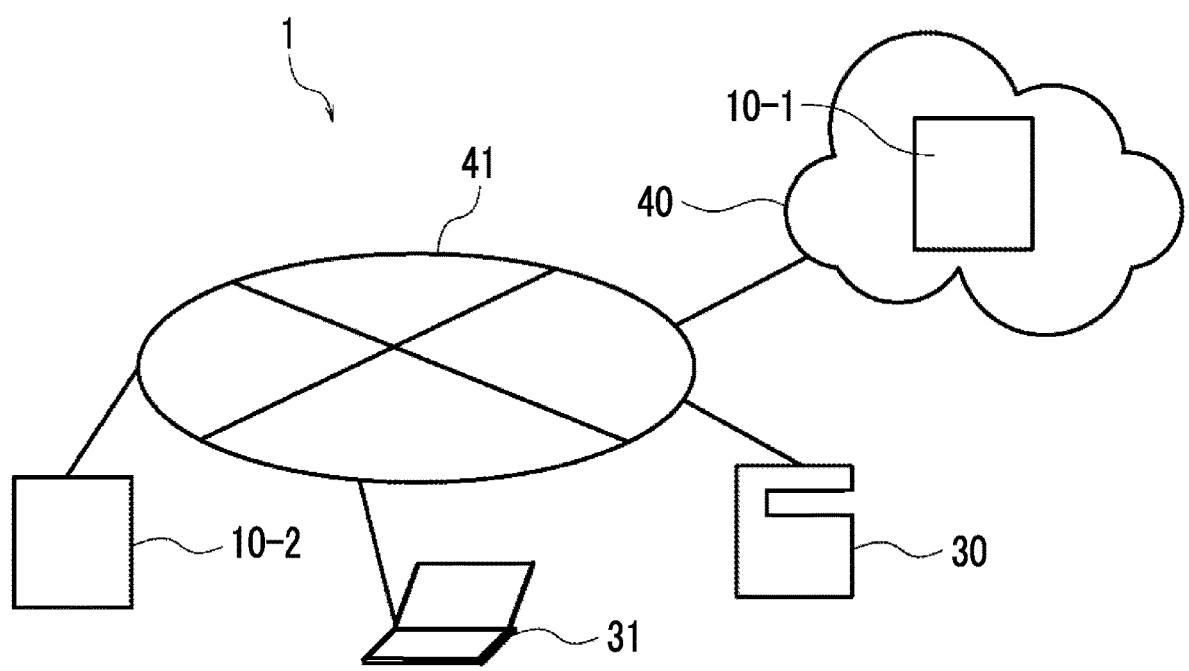
FIG. 2 is a block diagram showing an example of a configuration of an information processing system according to each exemplary embodiment.

Next, the information processing system 1 according to the present exemplary embodiment will be described with reference to FIG. 2. As shown in FIG. 2, the information processing system 1 includes information processing apparatuses 10-1 and 10-2, a cloud 40, a network 41, an image processing apparatus 30, and a terminal apparatus 31. However, the information processing system 1 does not have to include all of these constituents, and may be configured by selecting necessary constituents according to the purpose, system conditions, and the like.

The network 41 is, for example, an IP network, and is a system for connecting various apparatuses to each other. A connection form of the network 41 may be wired or wireless, and may be a premises network such as a local area network (LAN). The cloud 40 is a system that provides various services via the network 41 such as an IP network. Each of the information processing apparatuses 10-1 and 10-2 is an apparatus having the same functions as the information processing apparatus 10, and a form in which the information processing apparatus 10-1 is disposed on the cloud 40 and a form in which the information processing apparatus 10-2 is disposed on the network 41 are shown. That is, an example in which the information processing apparatus 10-1 is connected to the cloud 40 via the communication I/F 17 and an example in which the information processing apparatus 10-2 is connected to the network 41 via the communication I/F 17 are shown. In this example, the information processing apparatuses 10-1 and 10-2 are implemented by a server as an example. However, the present exemplary embodiment is not limited to this, and the information processing apparatus 10-1 or 10-2 may be used stand-alone.

The image processing apparatus 30 is a multifunction peripheral connected to the cloud 40 or the network 41 and having, for example, a scanning (image scanning) function, acquires a plurality of scanned images obtained by scanning a bundle of documents, and sends the plurality of acquired scanned images to the information processing apparatus 10-1 or 10-2. In this case, each scanned image may be subjected to an OCR process and then sent to the information processing apparatus 10-1 or 10-2. The terminal apparatus 31 is, for example, a personal computer (PC), and, in one form of the information processing system 1, controls the information processing apparatus 10-1 or 10-2 and the image processing apparatus 30 and receives results processed by the information processing apparatus 10-1 or 10-2.

Meanwhile, in document processing work, a set including a standard document such as a slip and a document (related document) related to the standard document may be wanted to be collectively handled as a standard document bundle, such as a combination of an "invoice" and a "delivery note". On the other hand, in daily document processing work, in many cases, the set may be processed as a group of documents (hereinafter, referred to as a "document group") without being aware of the standard document bundle as described above and without distinguishing the standard document bundle for each project, for example. In such a case, documents may be required to be divided into each standard document bundles according to each closing date or the end of the project.

In the related art, there is a technique in which a title extraction process is performed on a plurality of scanned images obtained by performing an OCR process on a document group, and the document group is divided into a set of documents associated with the title on the basis of the extracted title. However, in this technique of the related art, since the document is mechanically divided for each title, for example, a document having the title "invoice" and a document having the title "delivery note" that are not originally wanted to be divided are divided. That is, although the title extraction is appropriate for processing a single slip, a scanned image may not be appropriately divided into standard document bundles only through the title extraction process.

Therefore, the present exemplary embodiment of the present invention employs a configuration in which scanned images obtained by scanning a bundle of paper media including a plurality of standard document bundles are first divided into a plurality of division candidate bundles according to a result of the title extraction process, then whether or not the division candidate bundles are to be reintegrated is determined by using identifiers acquired by performing the key-value extraction process on the division candidate bundles, and finally the division candidate bundles are divided into standard document bundles. In the present exemplary embodiment, the "identifier" refers to text that is assigned to be common within one standard document bundle and to be different between different standard document bundles. Consequently, a division candidate bundle mechanically divided by a title may be reintegrated into a set of substantially related documents.

Figure 3:
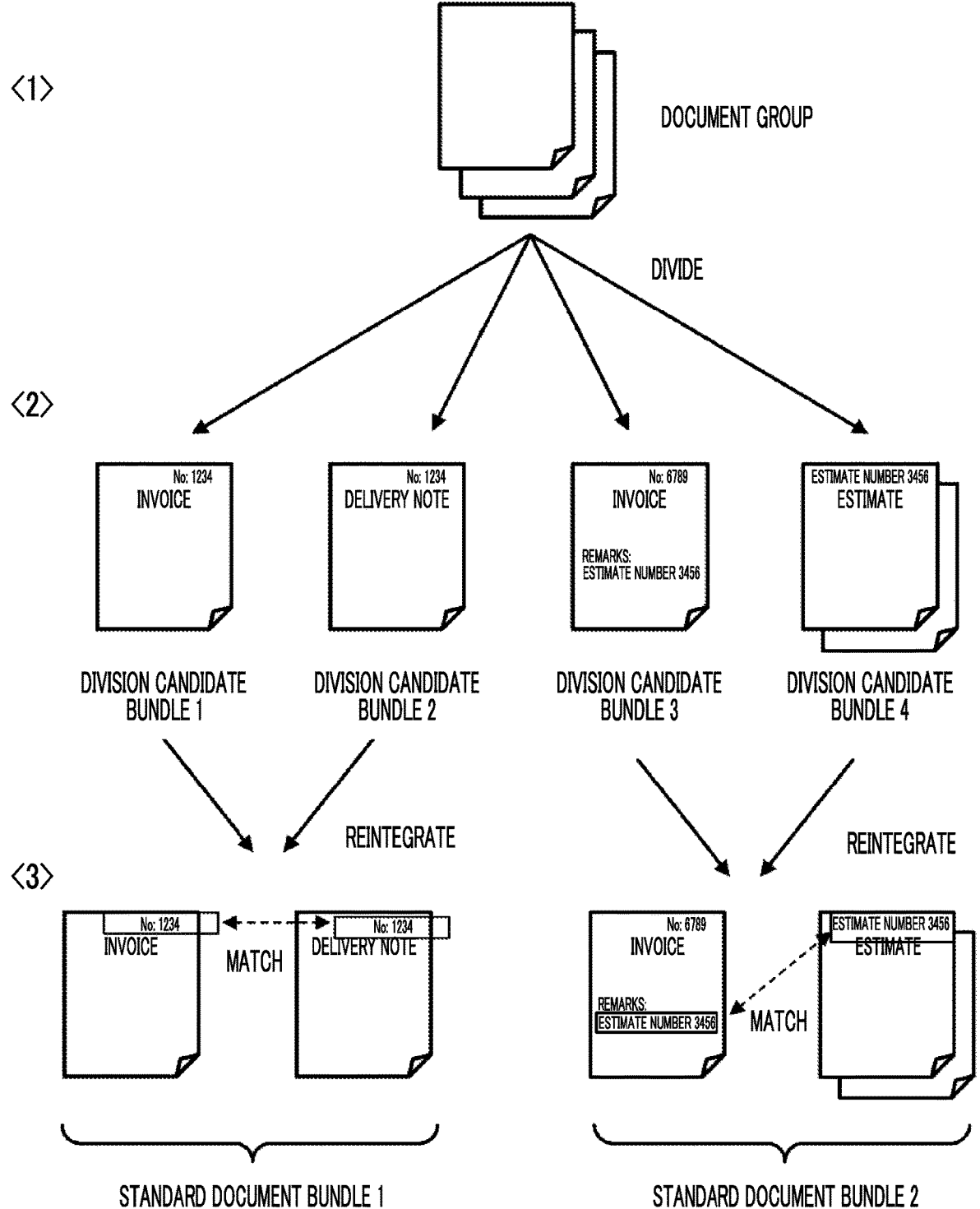
FIG. 3 is a schematic diagram showing a flow of a division process according to a first exemplary embodiment.

The information processing apparatus and the information processing program according to the present exemplary embodiment will be described with reference to FIGS. 3 to 5. FIG. 3 is a schematic diagram showing a flow of division process executed by the information processing apparatus 10. In FIG. 3, the information processing apparatus 10 is assumed to have already acquired a document group which is a plurality of scanned images having undergone an OCR process, and the document group is stored in the storage 14 as an example.

A part <1> in FIG. 3 shows a group of documents before division, that is, a plurality of scanned images having undergone the OCR process. A part <2> in FIG. 3 shows a state in which the document group is divided into a plurality of division candidate bundles as a result of executing a title extraction process thereon. A part <3> in FIG. 3 shows a state in which the division candidate bundles are reintegrated into wanted standard document bundles by using identifiers acquired by further executing key-value extraction.

Here, in the "title extraction", a title in a scanned image is extracted by using a size, a position, and the like of text in the scanned image. That is, the title extraction is performed in consideration of characteristics specific to a title, such as the title being often written in large characters at the top of the first page in the document group. For example, the type (invoice, delivery note, or the like) of the scanned image as a slip is specified by using the extracted title. In other words, a single slip is specified through the title extraction.

In the example shown in the part <2> in FIG. 3, as a result of the title extraction, the document group is divided into four division candidate bundles 1, 2, 3, and 4. That is, the title "invoice" is extracted to generate the division candidate bundle 1, the title "delivery note" is extracted to generate the division candidate bundle 2, the title "invoice" is extracted to generate the division candidate bundle 3, and the title "estimate" is extracted to generate the division candidate bundle 4.

However, the division candidate bundle 1 and the division candidate bundle 2 have the same document number, and the "delivery note" of the division candidate bundle 2 is an accompanying document of the "invoice" of the division candidate bundle 1. That is, there is a relationship in which the division candidate bundle 1 is a standard document and the division candidate bundle 2 is a related document, and the division candidate bundle 1 and the division candidate bundle 2 are wanted not to be divided and to be one bundle. In the document of the division candidate bundle 3, there is a notation of "remarks: estimate number 3456", and the division candidate bundle 4 is an "estimate" of "estimate number 3456". That is, there is a relationship in which the division candidate bundle 3 is a standard document and the division candidate bundle 4 is a related document, and the division candidate bundle 3 and the division candidate bundle 4 are wanted not to be divided and to be one bundle.

Therefore, in the present exemplary embodiment, key-value extraction is further performed. In the "key-value extraction", an item (key) is searched for in a document, and a value corresponding to the found item is extracted. In the example shown in the part <2> in FIG. 3, "No." is recognized as a key and "1234" is recognized as a value in the division candidate bundles 1 and 2. in the division candidate bundles 3 and 4, an "estimate number" is recognized as a key and "3456" is recognized as a value. In the present exemplary embodiment, text as a result extracted through the key-value extraction is referred to as an "identifier", and division candidate bundles having the same identifier are reintegrated to generate a standard document bundle.

In the example shown in the part <3> in FIG. 3, since the identifier "No. 1234" is common (match), the division candidate bundle 1 and the division candidate bundle 2 are reintegrated to generate the standard document bundle 1. That is, the division candidate bundle 1 is set as the head, and the division candidate bundle 2 is made continuous to the division candidate bundle 1 to generate the standard document bundle 1. Since the identifier "estimate number 3456" is common (match), the standard document bundle 2 is generated. That is, the division candidate bundle 3 is set as the head, and the division candidate bundle 4 is made continuous to the division candidate bundle 3 to generate the standard document bundle 2. That is, the document group is divided into a standard document bundle in which a standard document and a related document are combined, which is the object of the present exemplary embodiment.

From the viewpoint of better understanding, in the present exemplary embodiment, a form in which title extraction and key-value extraction are executed in this order has been described as an example. However, the present exemplary embodiment is not limited to this, and key-value extraction and title extraction may be executed in this order, or key-value extraction and title extraction may be executed at the same time. However, in the form of executing title extraction and key-value extraction in this order, the following effects are achieved. That is, in a case of first executing the title extraction, pages from a document in which a title A is written to the front of a document in which a title B is written may be processed as a bundle of documents related to the title A, and thus there is an effect of omitting the key-value extraction process for determining a bundle to which the document belongs to. That is, in a case where a common identifier is present in a cover of the title A and a cover of the title B, there is an effect that a matching process for checking whether or not the common identifier is present in the bundle of the documents is not required to be performed.

Next, a post-process according to the present exemplary embodiment will be described with reference to FIGS. 4A to 4C. The "post-process" according to the present exemplary embodiment refers to a method of storing standard document bundles after a document group is divided into the standard document bundles. In the present exemplary embodiment, three types of post-processes are provided as examples of the post-process. However, the post-process is not limited to this, and other appropriate post-processes may be performed depending on the purpose or the like. FIGS. 4A, 4B, and 4C respectively show a process 1, a process 2, and a process 3 as post-processes.

Details of each of the processes 1, 2, and 3 areas follows. As will be described later, the post-process may be designated by a user each time a division process according to the present exemplary embodiment is performed, or a predetermined process may be automatically executed.

Process 1

For each of the standard document bundle 1 and the standard document bundle 2 shown in FIG. 3, the titles of the division candidate bundles are connected, and a file name is given to be stored. Specifically, regarding the standard document bundle 1, as shown in FIG. 4A, the division candidate bundles 1 and 2 are collected and stored with a file name "Invoice_delivery_note_No1234". Regarding the standard document bundle 2, the division candidate bundles 3 and 4 are collected and stored with a file name "Invoice_estimate_No6789".

Process 2

For each of the standard document bundle 1 and the standard document bundle 2 shown in FIG. 3, a folder having text (for example, an identifier name) indicating each feature is created, and the division candidate bundle is stored in the folder. Specifically, as shown in FIG. 4B, regarding the standard document bundle 1, a folder with the name "No_1234" is created, and the division candidate bundles 1 and 2 are collectively stored in the folder. in this case, a file name of "Invoice_No1234" is given to the division candidate bundle 1, and a file name of "Delivery note_No1234" is given to the division candidate bundle 2. Regarding the standard document bundle 2, a folder with the name "No6789" is created, and the division candidate bundles 3 and 4 are collectively stored in the folder. In this case, a file name of "Invoice_No6789" is given to the division candidate bundle 3, and a file name of "Estimate_No3456" is given to the division candidate bundle 4.

Process 3

In a case where a key-value that refers to another division candidate bundle are extracted in a specific division candidate bundle as a result of division into division candidate bundles through the title extraction, a folder of the division candidate bundle that is the reference source is created, a file of the reference source division candidate bundle is stored in the folder, a folder of the reference destination division candidate bundle folder is further created, and a file of the reference destination division candidate bundle is stored in the folder. Specifically, as shown in FIG. 4C, regarding the standard document bundle 1, a folder (not shown) of the standard document bundle 1 is created, and the division candidate bundle 1 is stored in the folder with the file name "Invoice_No1234". A folder with the name "No1234_delivery note" is created, and the division candidate bundle 2 is stored in the folder with the file name "Delivery note_No1234". Regarding the standard document bundle 2, a folder (not shown) of the standard document bundle 3 is created, and the division candidate bundle 3 is stored in the folder with the file name "Invoice_No6789". A folder with the name "No6789_estimate" is created, and the division candidate bundle 4 is stored in the folder with the file name "Estimate_No3456".

Next, the division process executed by the information processing apparatus 10 will be described with reference to FIG. 5. The division process is a process of dividing a document group into standard document bundles, and FIG. 5 is a flowchart showing a flow of flow in a division process program. The division process program is stored in a storage section such as the ROM 12 or the storage 14, and the CPU 11 reads the program from the storage section, loads the program to the RAM 13 and the like, and executes the program. The division process program may be supplied from the outside via the reception unit 15 or the communication I/F. In FIG. 5, as an example, the information processing apparatus 10 acquires a plurality of scanned images (document group) that have undergone an OCR process from an external apparatus such as the image processing apparatus 30.

Figure 5:
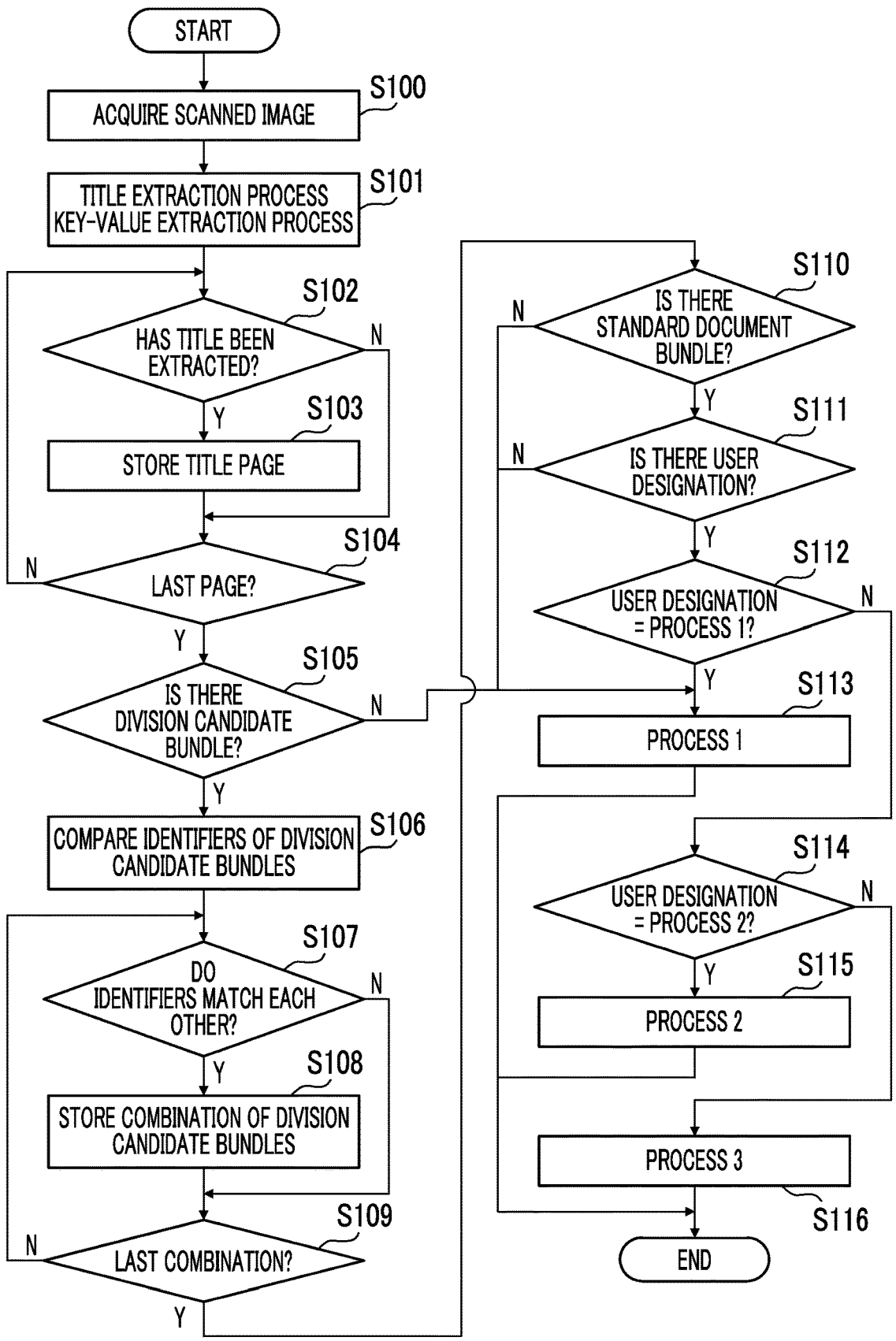
FIG. 5 is a flowchart showing a flow of information processing according to each exemplary embodiment.

As shown in FIG. 5, in step S100, a plurality of scanned images are acquired.

In step S101, the title extraction process and the key-value extraction process are executed on all of the plurality of scanned images. Either the title extraction process or the key-value extraction process may be first in an execution order.

In step S102, whether or not a title has been extracted from the plurality of scanned images is determined. In a case where the determination is affirmative, the process proceeds to step S103, and, in a case where the determination is negative, the process proceeds to step S104.

In step S103, a page from which the title has been extracted is stored. The page from which the title has been extracted is, for example, a first page of each of the division candidate bundles 1, 2, 3, and 4 in <2> in FIG. 3.

In step S104, whether the current page is the last page of the plurality of scanned images is determined. In a case where the determination is negative, the process returns to step S102, and the process of determining whether the title has been extracted is continued. On the other hand, in a case where the determination is affirmative, the process proceeds to step S105.

In step S105, whether or not there are division candidate bundles is determined. Whether or not there are division candidate bundles is determined on the basis of whether or not there are a plurality of scanned images from which titles have been extracted. In a case where the determination is affirmative, the process proceeds to step S106, and, in a case where the determination is negative, the process proceeds to step S113.

In step S106, identifiers generated as a result of the key-value extraction are compared between the division candidate bundles.

In step S107, whether or not the identifiers match between the division candidate bundles is determined. In a case where the determination is affirmative, the process proceeds to step S108, and, in a case where the determination is negative, the process proceeds to step S109. In the present exemplary embodiment, a form in which the document number is used as a key-value has been described as an example, but the key-value is not limited to this, and text assumed in advance (for example, "attached document" that will be described later, or a page number) may be used. A key-value value assumed in advance may be stored in a storage section such as the ROM 12 in advance. Prior to the division process, the user may input a key-value via, for example, the UI 16.

In step S108, a combination of division candidate bundles, that is, a standard document bundle is stored.

In step S109, whether the combination of the division candidate bundles is a last combination is determined. In a case where the determination is affirmative, the process proceeds to step S110, and, in a case where the determination is negative, the process returns to step S107 and the determination of whether the identifiers match each other is continued.

In step S110, whether or not there is a standard document bundle is determined. In a case where the determination is affirmative, the process proceeds to step S111, and, in a case where the determination is negative, the process proceeds to step S113.

In step S111, whether or not there is user designation for post-process is determined. In a case where the determination is affirmative, the process proceeds to step S112, and, in a case where the determination is negative, the process proceeds to step S113. That is, in the present exemplary embodiment, in a case where there is no user designation for the post-process, the process 1 is executed. However, the present exemplary embodiment is not limited to this, and the process 2 or the process 3 may be executed.

In step S112, whether the user designation for the post-process is the process 1. In a case where the determination is affirmative, the process proceeds to step S113, the process 1 is executed, and the division process program is finished. On the other hand, in a case where the determination is negative, the process proceeds to step S114.

In step S114, whether the user designation for the post-process is the process 2. In a case where the determination is affirmative, the process proceeds to step S115, the process 2 is executed, and the division process program is finished. On the other hand, in a case where the determination is negative, the process proceeds to step S116.

In step S116, the process 3 is executed for the post-process, and the division process program is finished.

First Modification Example of First Exemplary Embodiment

In the first exemplary embodiment described above, a form of automatically extracting a key-value value has been described as an example, but the present exemplary embodiment may employ a form in which a user customizes (changes specification) a key-value value. For example, in a case where a document related to a master apparatus and a document of a slave apparatus configuring a part of the master apparatus are mixed in a document group, these documents may be wanted to be handled as a group of standard document bundles.

Hereinafter, a description will be made assuming that the following documents are present in the document group.
(1) Regarding a slave apparatus 1, a document with the title "Estimate" and the document number "Estimate No. 1234"
(2) Regarding a slave apparatus 2, a document with the title "Estimate" and the document number "Estimate No. 2345".

The documents (1) and (2) are divided in a typical key-value extraction process because identifiers are different.

In this case, for example, a key that can identify a master apparatus (for example, a model number of the master apparatus) may be associated with a value corresponding to a slave apparatus (for example, a model number of the slave apparatus) and registered in advance, and, in a case where the value is associated with the key, documents related to the slave apparatuses 1 and 2 may be reintegrated together with documents related to the master apparatus as a division candidate bundle. The above functions may be custom-designated by the division process program for each user, for example. That is, in the division process program, an option of "do not divide in a case where values extracted from a certain key are "same" as each other or are "same as XX"" is prepared such that the user can designate the functions in advance. In a case where there is the user's designation, the designation may be stored in a storage section such as the storage 14, and may be given a higher priority than other division rules.

Second Modification Example of First Exemplary Embodiment

In the first exemplary embodiment described above, a from in which an extracted key-value value is a single key-value value has been described as an example, but the present exemplary embodiment may employ a form in a case where a plurality of key-value values are extracted. For example, the following division candidate bundles are assumed to be generated as a result of title extraction.
(1) Division candidate bundle 1 (total number of pages 3) Page 1: Title "Estimate", estimate No. "1234", and subject "YY"
(2) Division candidate bundle 2 (total number of pages 2) Page 1: Title "Estimate", estimate No. "2345", and subject "YY"
(3) Division candidate bundle 3 (total number of pages 4) Page 1: Title "Delivery note", estimate No. "2345", and subject "YY"
(4) Division candidate bundle 4 (total number of pages 2) Page 1: Title "Delivery note", estimate No. "3467", and subject "ZZ"

In the case of the above example, two types including a combination of the estimate No. "1234", estimate No. "2345", and estimate No. "3467" and a combination of the subject "YY" and the subject "ZZ" are present as key-value values. In such a case, an identifier to be used is determined in advance, but, for example, a key-value value that increases the number of pages of the standard document bundle may be used. In the case of the above example, a total number of pages of the key-value value subject "YY" is nine pages (a total number of pages of the division candidate bundles 1, 2, and 3), and a total number of pages of the key-value value estimation No. "2345" is six pages (a total number of pages of the division candidate bundles 2 and 3). Therefore, the subject "YY" is used as an identifier, the first nine pages are collected as the standard document bundle 1, and the last two pages are set as the standard document bundle 1.

Second Exemplary Embodiment

An information processing apparatus, an information processing system, and an information processing program according to the present exemplary embodiment will be described with reference to FIGS. 6 to 7C. The present exemplary embodiment employs a form in which an attached document is extracted through key-value extraction in the first exemplary embodiment. Therefore, since the information processing apparatus, the information processing system, and the information processing program according to the present exemplary embodiment are fundamentally the same as the information processing apparatus, the information processing system, and the information processing program of the first exemplary embodiment, detailed description thereof will be omitted with reference to FIGS. 1, 2, and 5 as necessary. In the present exemplary embodiment, the "attached document" refers to a document attached to a standard document.

Figure 6:
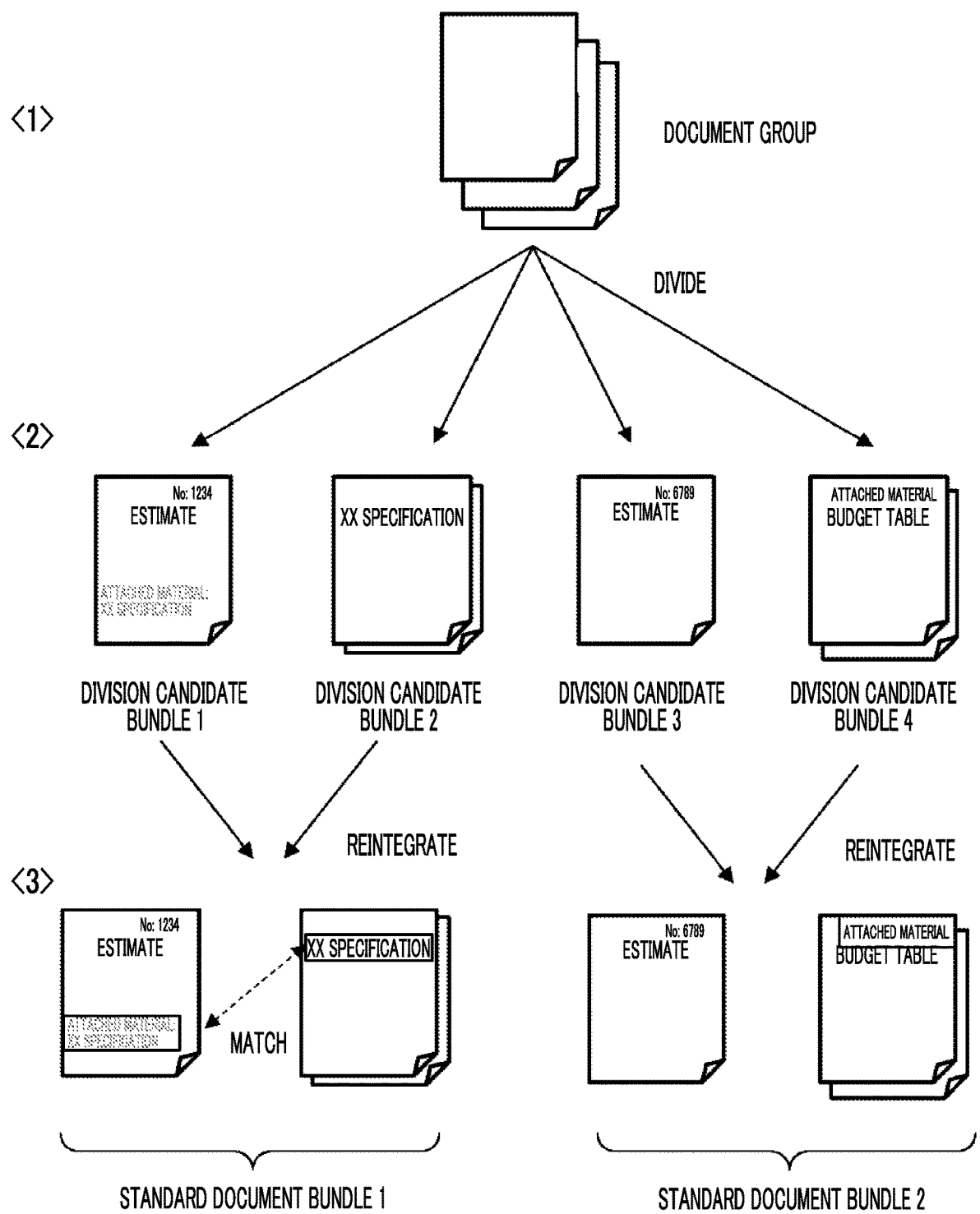
FIG. 6 is a schematic diagram showing a flow of a division process according to a second exemplary embodiment.

FIG. 6 shows a flow of a division process according to the present exemplary embodiment, <1> in FIG. 6 shows a document group before the division process, that is, a plurality of scanned images, and <2> in FIG. 6 shows in which four division candidate bundles are generated as a result of performing title extraction on the document group, and <3> in FIG. 6 shows a state in which the division candidate bundles are reintegrated into two standard document bundles as a result of further performing key-value extraction. From the viewpoint of better understanding, in the present exemplary embodiment, a from in which title extraction and key-value extraction are executed in this order will be described as an example. However, the present exemplary embodiment is not limited to this, and key-value extraction and title extraction may be executed in this order, or key-value extraction and title extraction may be executed at the same time.

As shown in <2> in FIG. 6, as a result of title extraction, the document group is divided into four division candidate bundles 1, 2, 3, and 4. The division candidate bundle 1 is an estimate to which the document number "No. 1234" is given, and has the notation "attached document: XX specification". The division candidate bundle 3 is an estimate to which the document number "No. 6789" is given. Here, since the division candidate bundle 2 has the notation "XX specification" and immediately follows the division candidate bundle 1, the division candidate bundle 1 and the division candidate bundle 2 have a relationship of a standard document and a related document and thus are not wanted to be divided. Since the division candidate bundle 4 is a "budget table" with the notation "attached material" and immediately follows the division candidate bundle 3, the division candidate bundle 3 and the division candidate bundle 4 have a relationship of a standard document and a related document and are not wanted to be divided.

Therefore, in the present exemplary embodiment, in a case where a result of key-value extraction satisfies a specific condition, an attached document is assumed to be found, and the attached document is regarded as a related document and is reintegrated with the preceding division candidate bundle. Specifically, the value "XX specification" of the key-value value "attached material: XX specification" ("attached material" is a key and "XX specification" is a value) of the division candidate bundle 1 is the same as the title of the division candidate bundle 2, and the division candidate bundle 2 is continuous to the division candidate bundle 1. In this case, the division candidate bundle 2 is regarded as an attached document, and the division candidate bundle 1 and the division candidate bundle 2 are reintegrated into the standard document bundle 1. That is, the division candidate bundle 1 is set as the head, and the division candidate bundle 2 is made continuous to the division candidate bundle 1 to generate the standard document bundle 1. In this case, the "XX specification" is regarded as an identifier. On the other hand, the value "attached material" is extracted, and thus the division candidate bundle 4 is clearly continuous to the preceding division candidate bundle 3. In this case, the division candidate bundle 4 is regarded as an attached document, and the division candidate bundle 3 and the division candidate bundle 4 are reintegrated into the standard document bundle 2. That is, the division candidate bundle 3 is set as the head, and the division candidate bundle 4 is made continuous to the division candidate bundle 3 to generate the standard document bundle 2. In this case, the "attached material" is regarded as an identifier. In the example of the standard document bundle 2, the term "attached material" may be registered in advance in the ROM 12 or the like as a value for displaying an attached document.

Also in the present exemplary embodiment, in the same manner as in the first exemplary embodiment, a post-process may be performed after the division process is executed. FIGS. 7A to 7C show post-processes according to the present exemplary embodiment, and FIGS. 7A, 7B, and 7C respectively show results of the process 1, the process 2, and the process 3. Since a concept and a procedure of the post-process are the same as the concept and the procedure of the first exemplary embodiment, only the results will be briefly described here.

Process 1

Regarding the standard document bundle 1, as shown in FIG. 7A, the division candidate bundles 1 and 2 are collected and stored with a file name "Estimate_XX specification_No1234". Regarding the standard document bundle 2, the division candidate bundles 3 and 4 are collected and stored with a file name "Estimate budget table No6789".

Process 2

As shown in FIG. 7B, regarding the standard document bundle 1, a folder with the name "No_1234" is created, and the division candidate bundles 1 and 2 are collectively stored in the folder. in this case, a file name "Estimate_No1234" is given to the division candidate bundle 1, and a file name "XX specification_No1234" is given to the division candidate bundle 2. Regarding the standard document bundle 2, a folder with the name "No6789" is created, and the division candidate bundles 3 and 4 are collectively stored in the folder. In this case, a file name "Estimate_No6789" is given to the division candidate bundle 3, and a file name "Budget table" is given to the division candidate bundle 4.

Process 3

As shown in FIG. 7C, regarding the standard document bundle 1, a folder (not shown) of the standard document bundle 1 is created, and the division candidate bundle 1 is stored in the folder with a file name "Estimate_No1234". A folder with the name "Estimate_No1234_attached material"

is created, and the division candidate bundle 2 is stored in the folder with a file name "XX specification_No1234". Regarding the standard document bundle 2, a folder (not shown) of the standard document bundle 3 is created, and the division candidate bundle 3 is stored in the folder with a file name "Estimate_No6789". A folder with the name "Estimate_No6789 attached material" is created, and the division candidate bundle 4 is stored in the folder with a file name "Budget table".

Third Exemplary Embodiment

An information processing apparatus, an information processing system, and an information processing program according to the present exemplary embodiment will be described with reference to FIGS. 8 to 9C. The present exemplary embodiment employs a form in which a page number is extracted through key-value extraction in the first exemplary embodiment. Therefore, since the information processing apparatus, the information processing system, and the information processing program according to the present exemplary embodiment are fundamentally the same as the information processing apparatus, the information processing system, and the information processing program of the first exemplary embodiment, detailed description thereof will be omitted with reference to FIGS. 1, 2, and 5 as necessary.

Figure 8:
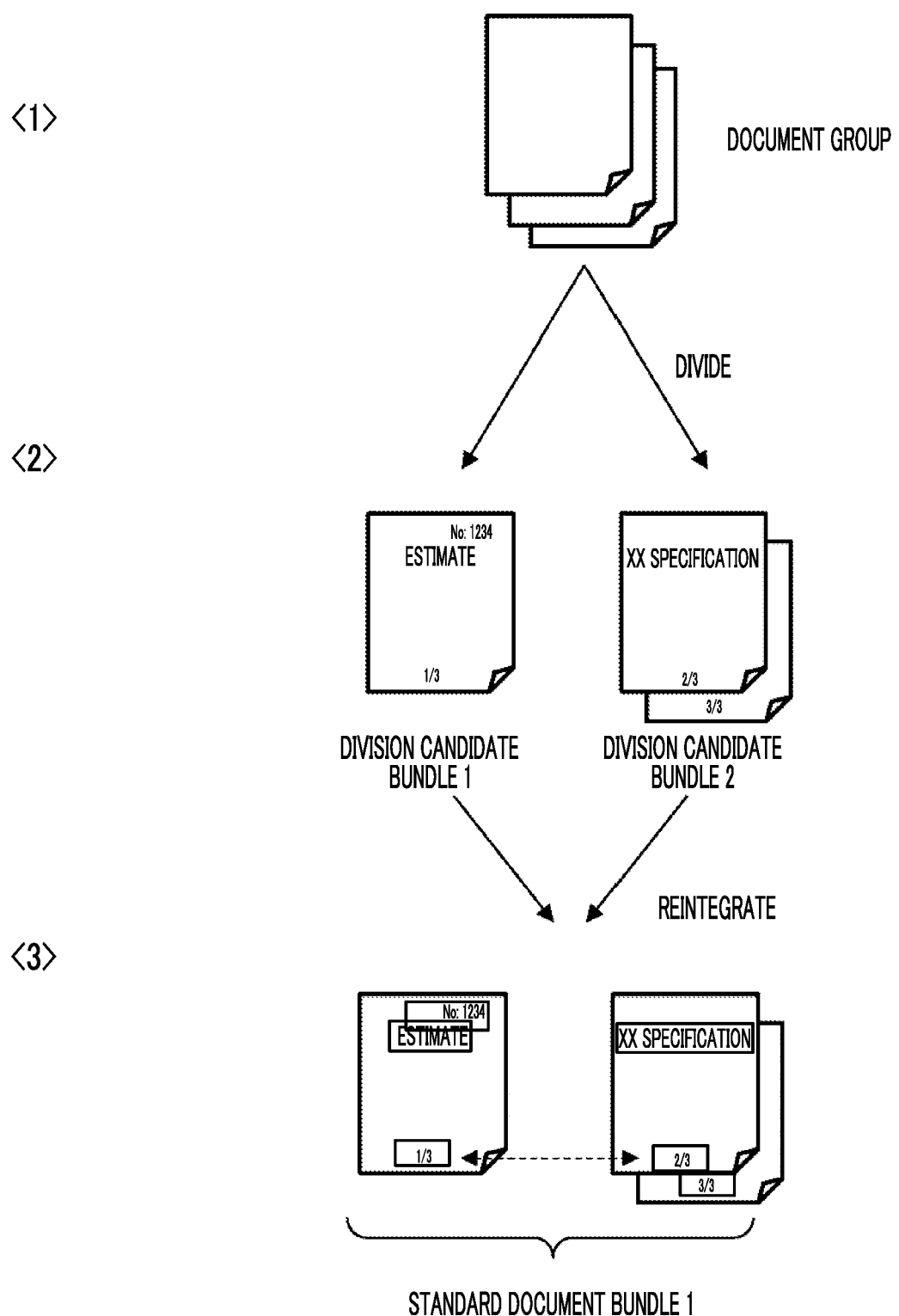
FIG. 8 is a schematic diagram showing a flow of division process according to a third exemplary embodiment.

FIG. 8 shows a flow of a division process according to the present exemplary embodiment, <1> in FIG. 8 shows a document group before the division process, that is, a plurality of scanned images, and <2> in FIG. 8 shows in which two division candidate bundles are generated as a result of performing title extraction on the document group, and <3> in FIG. 8 shows a state in which the division candidate bundles are reintegrated into a single standard document bundle as a result of further performing key-value extraction. From the viewpoint of better understanding, in the present exemplary embodiment, a from in which title extraction and key-value extraction are executed in this order will be described as an example. However, the present exemplary embodiment is not limited to this, and key-value extraction and title extraction may be executed in this order, or key-value extraction and title extraction may be executed at the same time.

As shown in <2> in FIG. 8, as a result of title extraction, the document group is divided into two division candidate bundles 1 and 2. The division candidate bundle 1 is an estimate to which the document number "No. 1234" is given, and the division candidate bundle 2 is a specification to which the title "XX specification" is given. Here, a page number "1/3" is written in the lower column of the division candidate bundle 1, and the page number of "2/3" is written in a lower field of the division candidate bundle 2. Therefore, the division candidate bundle 1 and the division candidate bundle 2 are considered to be a continuous mass of documents and thus are not wanted to be divided.

Therefore, in the present exemplary embodiment, in a case where a result of key-value extraction satisfies a specific condition, a page number is assumed to be found, and a document of which the page number is continuous to a head document (in this example, the division candidate bundle 1) is regarded as a related document and is reintegrated with the preceding division candidate bundle. Specifically, the page number is considered as a form of key-value. That is, in the case of the division candidate bundle 1, "/" is considered as a key and "1, 3" is considered as a value, and in the case of the division candidate bundle 2, "/" is considered as a key and "2, 3" is considered as a value. The key-value of such a form may be registered in advance in a storage section such as the ROM 12. Consequently, the division candidate bundle 1 and the division candidate bundle 2 having consecutive page numbers are reintegrated into the standard document bundle 1. A format of the key-value of the page number is not limited to "Y/X" (where Y and X are integers), and may be, for example, "Y/" or "Y:X". Determination of the page number may be restricted to only a lower part or an upper part of a page. In a case of being restricted to the lower part or the upper part, the page number may be only a number.

Figure 9A:
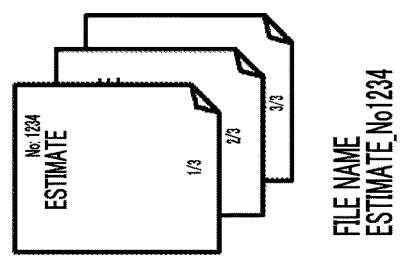
FIGS. 9A to 9C are schematic diagrams showing examples of post-processes of the division process according to the third exemplary embodiment.
Figure 9B:
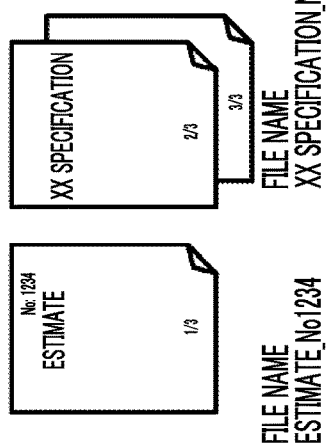

Also in the present exemplary embodiment, in the same manner as in the first exemplary embodiment, a post-process may be performed after the division process is executed. FIGS. 9A to 9C show post-processes according to the present exemplary embodiment, and FIGS. 9A, 9B, and 9C respectively show results of the process 1, the process 2, and the process 3. Since a concept and a procedure of the post-process are the same as the concept and the procedure of the first exemplary embodiment, only the results will be briefly described here.

Process 1

As shown in FIG. 9A, a file name "Estimate_No1234" is given, and the division candidate bundles 1 and 2 are collectively stored.

Process 2

As shown in FIG. 9B, a file name "Estimate_No1234" is given to the division candidate bundle 1, a file name "XX specification_No1234" is given to the division candidate bundle 2, and both are stored separately. "No1234" may be omitted from each file name.

Process 3

Figure 9C:
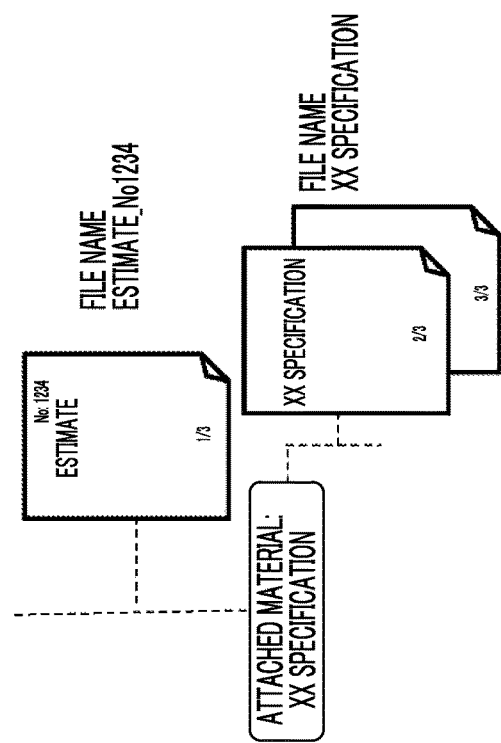

As shown in FIG. 9C, a folder (not shown) of the standard document bundle 1 is created, and the division candidate bundle 1 is stored in the folder with a file name "Estimate_No1234". A folder with the name "Attached material_XX specification" is created, and the division candidate bundle 2 is stored in the folder with a file name "XX specification".

In each of the above exemplary embodiments, a form in which title extraction is executed on the entire document group and then key-value comparison is executed on the entire document group has been described as an example, but this is only an example, and a range of documents for which key-values are compared may be restricted. That is, comparison of key-value extraction results for a plurality of division candidate bundles is restricted to a key-value written on a page on which a title is written. In other words, a key-value extraction result of a page from which a title cannot be extracted is not used for comparison. Consequently, key-value comparison between division candidate bundles is restricted, and thus improvement in a processing speed is expected.

In the above exemplary embodiments, the information processing apparatus in a form of being supplied with data of a plurality of scanned images having undergone an OCR process from the outside has been described, but this is only an example. For example, a form of an information processing apparatus having a built-in image scanning apparatus and executing the entire division process may be employed. Alternatively, a form in which an OCR function is installed and a plurality of scanned images not having undergone an OCR process are supplied may be employed.

The configuration of the information processing apparatus 10 described in the above exemplary embodiments is only an example, and may be changed depending on the situations within the scope without departing from the spirit.

The flow of the process of the program described in the above exemplary embodiments is also an example, and unnecessary steps may be deleted, new steps may be added, or the processing order may be changed within the scope without departing from the spirit.

In the above-described respective exemplary embodiments, a description has been made of an aspect in which the information processing program is stored (installed) in the ROM 12 or the storage 14 in advance, but this is only an example. The program may be provided in a form of being recorded on recording media such as a compact disk read only memory (CD-ROM), a digital versatile disk read only memory (DVD-ROM), and a Universal Serial Bus (USB) memory. The program may be provided in a form of being downloaded from an external apparatus via a network.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire a plurality of scanned images obtained by scanning a bundle of paper media including a plurality of standard document bundles each of which is a set of a standard document and a related document related to the standard document;
extract a title from the plurality of scanned images;
extract, from the plurality of scanned images, an identifier that is assigned to be common within one standard document bundle and to be different between different standard document bundles;
only perform a comparison on identifiers extracted from the plurality of scanned images including the title;
divide the plurality of scanned images according to a comparison result of the identifiers extracted from the plurality of scanned images including the title; and
divide the plurality of scanned images into bundles such that a scanned image from which the title has been extracted is set as a bundle head, scanned images having the same identifier are included in the same bundle, and scanned images having different identifiers are included in different bundles.

2. The information processing apparatus according to claim 1, wherein the processor is configured to:
extract the identifier by performing an extraction process of at least one of an item or a value corresponding to the identifier designated in advance by a user on the plurality of scanned images.

3. The information processing apparatus according to claim 2, wherein the processor is configured to:
execute a process of extracting the title and a process of extracting the identifier in this order.

4. The information processing apparatus according to claim 1, wherein the processor is configured to:
execute a process of extracting the title and a process of extracting the identifier in this order.

5. An information processing apparatus comprising:
a processor configured to:
acquire a plurality of scanned images obtained by scanning a bundle of paper media including a plurality of standard document bundles each of which is a set of a standard document and a related document related to the standard document;
extract a title from the plurality of scanned images;
extract an identifier including predefined text from the plurality of scanned images;
only perform a comparison on identifiers extracted from the plurality of scanned images including the title;
divide the plurality of scanned images according to a comparison result of the identifiers extracted from the plurality of scanned images including the title; and
divide the plurality of scanned images into bundles such that a scanned image from which the title has been extracted is set as a bundle head, and a scanned image that is arranged to be continuous from the scanned image from which the title has been extracted and has a common identifier is included in the same bundle.

6. The information processing apparatus according to claim 5,
wherein the identifier is text indicating an attached document of a scanned image preceding the scanned image having the identifier, or a page number that is continuous from the scanned image preceding the scanned image having the identifier.

7. An information processing apparatus comprising:
means for acquiring a plurality of scanned images obtained by scanning a bundle of paper media including a plurality of standard document bundles each of which is a set of a standard document and a related document related to the standard document;
means for extracting a title from the plurality of scanned images;
means for extracting, from the plurality of scanned images, an identifier that is assigned to be common within one standard document bundle and to be different between different standard document bundles;
means for only performing a comparison on identifiers extracted from the plurality of scanned images including the title;
means for dividing the plurality of scanned images according to a comparison result of the identifiers extracted from the plurality of scanned images including the title; and
means for dividing the plurality of scanned images into bundles such that a scanned image from which the title has been extracted is set as a bundle head, scanned images having the same identifier are included in the same bundle, and scanned images having different identifiers are included in different bundles.

8. An information processing method comprising:
acquiring a plurality of scanned images obtained by scanning a bundle of paper media including a plurality of standard document bundles each of which is a set of a standard document and a related document related to the standard document;
extracting a title from the plurality of scanned images;
extracting, from the plurality of scanned images, an identifier that is assigned to be common within one standard document bundle and to be different between different standard document bundles;
only performing a comparison on identifiers extracted from the plurality of scanned images including the title;
dividing the plurality of scanned images according to a comparison result of the identifiers extracted from the plurality of scanned images including the title; and
dividing the plurality of scanned images into bundles such that a scanned image from which the title has been extracted is set as a bundle head, scanned images having the same identifier are included in the same bundle, and scanned images having different identifiers are included in different bundles.

\* \* \* \* \*